June 19, 1951 R. W. OLSON 2,557,888
ATTENUATING CIRCUIT
Filed March 7, 1949
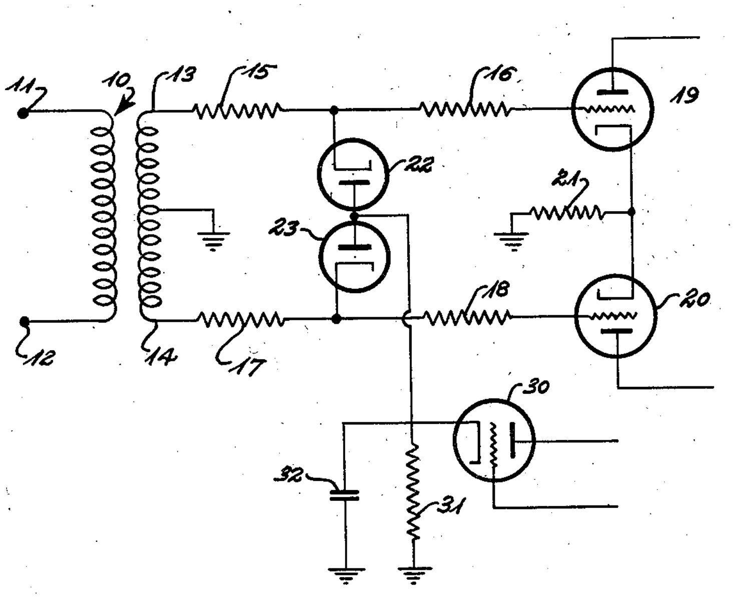
INVENTOR.
Robert W. Olson
BY
Stevens, Davis, Miller & Mosher
ATTORNEYS.

Patented June 19, 1951 2,557,888

UNITED STATES PATENT OFFICE 2,557,888

ATTENUATING CIRCUIT

Robert W. Olson, Dallas, Tex., assignor to Geophysical Service, Inc., Dallas, Tex., a corporation of Delaware Application March 7, 1949, Serial No. 80,087

3 Claims. (Cl. 178—44)

This invention relates to thermionic tube circuits and particularly to a variable gain or variable attenuation thermionic tube circuit.

It is necessary in seismograph automatic volume control systems, and in many other servo and control systems, to vary the gain or the attenuation of a circuit very rapidly. In seismograph amplifiers, it is often necessary to vary the sensitivity of the system through a ratio approaching a million to one, in a very short time, possibly as short as a tenth of a second under certain operating conditions, particularly, immediately after the reception of the first breaks.

Numerous arrangements or circuits have been suggested for this purpose in the past, but all have been either too slow in operation, too complicated and expensive to construct, or too likely to introduce distortion into the signals.

Accordingly, it is the purpose of this invention to provide a circuit that will vary the amplitude of incoming signals over an extremely wide range, in a simple expedient manner, and without introducing appreciable distortion.

Although the circuit of this invention is subject to considerable variation as will be evident to those skilled in the art, this circuit will be most easily understood by a description of one specific embodiment thereof, followed by some suggestions as to possible variations that may be made within the scope of this invention. Accordingly, reference will immediately be made to the sole figure of the drawing, which schematically illustrates the preferred embodiment of this invention, and this embodiment explained by reference thereto.

As illustrated, signals are introduced into the primary of a transformer 10 through conventional terminals 11 and 12. The secondary of this transformer is center-tapped and the center-tap grounded. The outer ends 13 and 14 of the secondary winding of the transformer 10 are each connected through a pair of resistances, 15 and 16, and 17 and 18, respectively, to a grid of a triode amplifier tube, 19 and 20, respectively. The cathodes of the triode amplifier tubes are connected in the usual manner through a biasing resistor 21 to ground and the plates are connected in the usual manner to a source of plate potential, and coupled so as to transfer the signals reaching them to a further amplifier stage or the output terminals of the device.

Thus far there has been described a conventional push-pull amplifier system in which a pair of resistors is connected in series with each of the amplifier tube grids.

For the purpose of the present invention, there is added to this circuit a pair of diodes 22 and 23, the cathode of one of these diodes being connected to one of the grid circuits between the two resistors therein and the cathode of the other diode being connected to the other grid circuit between the pair of resistors in that circuit. Thus, the cathode of one of the diodes 22 is connected between the resistors 15 and 16 in one of the grid circuits, and the cathode of the other diode 23 is connected between the resistors 17 and 18 in the other grid circuit. The plates of the two diodes 22 and 23 are connected together and means is provided for imparting to these plates a controllable potential positive with respect to ground.

As a result of this arrangement, electrons tend to flow from the negative terminal of the source of controllable potential through the ground connection into the cathode biasing resistor 21, through the amplifier tubes 19 and 20 to the grids of these tubes, through the grid resistors 16 and 18 and from there through the cathodes of the diodes 22 and 23 to the plates of these diodes. Current also tends to flow through the ground connection and the secondary of the signal transformer 10 and the resistors 15 and 17 to the cathodes of the diodes 22 and 23 and from there to the plates.

In order that the flow of current be mostly through the cathode resistor-triode circuits and that maximum attenuation be large, the resistors 15 and 17 are made much higher in resistance than the resistors 16 and 18, for example, the resistors 15 and 17 may each have a value of around 10 megohms as compared with a value of around 200,000 ohms for each of the resistors 16 and 18. Using such resistances, the current flow through the secondary of the transformer 10 may be ignored.

Under these circumstances, if the controllable potential applied to the plates of the diodes 22 and 23 is zero, the grids of the amplifier tubes 19 and 20 will be negative with respect to the cathodes by reason of the bias furnished by the biasing resistor 21 and no current will flow in the control circuits. As positive potential is applied to the plates of the diodes 22 and 23 a point will be reached where these diodes will become conductive by reason of the fact that their plates become positive, or insufficiently negative to overbalance thermal velocity, with respect to their cathodes.

At this time current will begin to flow, making the grids of the triode amplifier tubes 19 and 20 positive with respect to their cathodes so that current can flow through the triodes as well as through the diodes. This current will be limited to a very small amount by the resistors 16 and 18 but the effect will nevertheless be to radically change the resistance of the two diodes 22 and 23 thus permitting these two diodes to greatly attenuate the signals across them in the grid circuits.

The cathode-grid portions of the triodes 19 and 20 also act as diodes of relatively low resistance when the grids become positive, or near positive, with respect to the cathodes and thus these portions of the triodes contribute still further attenuation, at times of the order of 20 to 1.

When no current is flowing in the control circuit, the resistance of the diodes is infinite and no attenuation is produced. However, with one milliampere of current flowing in each of the diodes, the incremental resistance of each of the diodes is decreased until it is of the order of a thousand ohms. Each of the diodes acts as an L-pad attenuator along with the resistance between it and the secondary of the transformer and the attenuation of around ten thousand to one thus is produced when a milliampere of current is flowing in the control circuit. On the other hand no attenuation is produced when no current is flowing in this circuit.

Because of the inclusion of the resistances 16 and 18 in the control portion of the grid circuits, the actual change of potential on the grids of the triode amplifier tubes is almost negligibly small and tends to be balanced out by the fact that there are two triodes of similar characteristics working in push-pull. The diode effect of the grid-cathode portion of the triodes will generally cause greater attenuation than would a very considerable bias change on the grids.

The effect on the attenuation or gain of the amplifier, in most cases, is as great as could be produced by changing the grid bias on the amplifier tubes to the extent of thirty to fifty volts, while the grid bias is actually changed only a volt or two at the most. Even this change occurs on the relatively stable part of the characteristic curves of the tubes and hence, almost no trouble with distortion of the signals is experienced.

Many ways can be provided for applying the necessary control voltage to the plates of the diodes. It can be supplied from any desired external means or fed back from a later stage of the amplifier if it is desired to effect automatic control.

One way of controlling the voltage on the plates of the diodes is to arrange a triode 30 as illustrated in the single figure of the drawing, so that the cathode of this triode is connected to the plates of the diodes and through a relatively high resistance 31 to ground. The plate of this triode is then connected to a source of potential, and the grid to an actuating circuit that raises the potential of the grid as it is desired to raise the potential of the plates of the diodes 22 and 23. A condenser 32 may be shunted across the cathode resistor 31 to furnish the desired amount of filtering, by-pass or time delay. With this arrangement, as the grid of the triode 30 is raised in voltage, current flows through the cathode resistor 31 and the triode 30, thus establishing a potential drop across the cathode resistor 31 which is applied to the plates of the diodes 22 and 23. The shunt capacity 32 gives the desired amount of filtering or time delay, shunts spurious or undesired alternating currents to ground, or both. In place of this arrangement, a battery and a manually or automatically-operated potentiometer could be used to vary the potential on the plates of the diodes 22 and 23 in known manner.

As pointed out above numerous variations in this circuit will be apparent to those skilled in the art and are contemplated by this invention. For example, tetrodes, pentodes or other thermionic tubes can be used in place of both the thermionic tube amplifiers 19 and 20 and in place of the diodes 22 and 23. Rectifiers of various types may also be used in place of the diodes 22 and 23 as may other highly polarized or nonlinear devices, the resistances of which change as control potential is applied. The values of the various resistors may be varied within relatively wide limits depending upon the amount of attenuation desired, the signal level, and other factors well-known to those skilled in the art. The principles of this invention may be applied to two or more stages of an amplifier and the entire circuit may be operated so as to attenuate rather than amplify if so desired. By use of the attenuator or amplifier of this invention, signals varying throughout a range of $10^6$ to 1 may conveniently be handled. The circuit is inherently balanced and stable in operation and double use of the amplifier tubes, for both amplification and attenuation results.

What is claimed is:

1. An electrical circuit of the type described that includes a pair of thermionic tube amplifiers connected in push-pull, a pair of resistances connected in series in the grid circuit of each thermionic tube amplifier, the one remote from the grid being of much greater resistance than the one adjacent the grid, a pair of thermionic diodes connected in series and in opposition across said grid circuits and between the resistors of the grid circuits, said rectifiers being connected so that the electrons can flow toward a point between the rectifiers rather than toward the grid circuit, and a source of controllable potential connected from a point between the rectifiers to the cathodes of the thermionic tube amplifiers.

2. A circuit of the type described that includes a transformer having a center-tapped secondary, a ground connection for the center tap of said secondary, a pair of thermionic tube amplifiers, a relatively high resistance connected to each end of said secondary, a relatively low resistance connected to the opposite end of each of said relatively high resistances, each of said relatively low resistances connected at its opposite end to the control grid of one of said thermionic tube amplifiers, a source of potential connected to the plate of each of said thermionic tube amplifiers, a biasing resistor connected between both of the cathodes of said thermionic tube amplifiers and ground, a pair of thermionic diodes having their plates connected together and the cathode of one connected between the high and low resistance of one grid circuit and the cathode of the other connected between the high and low resistance of the other grid circuit of the thermionic tube amplifiers, and a source of controllable potential connected between the plates of the thermionic diodes and ground.

3. A circuit as defined in claim 2 further characterized in that the source of controllable potential comprises a thermionic tube containing at least a cathode, a grid and a plate, a resistor connecting the cathode to ground, a conductor connecting the cathode to the plates of the thermionic diodes, a source of potential connected between the plate of this tube and ground and means controlling the relative potential of the grid of this tube.

ROBERT W. OLSON.

REFERENCES CITED

The following references are of record in the file of this patent:

UNITED STATES PATENTS

| Number | Name | Date |
|---|---|---|
| 2,003,428 | Cowan | June 4, 1935 |
| 2,084,135 | Ford | June 15, 1937 |